(12) United States Patent
Nagata et al.

(10) Patent No.: US 7,834,743 B2
(45) Date of Patent: Nov. 16, 2010

(54) RFID TAG AND RFID TAG COMMUNICATION DISTANCE MODIFICATION METHOD

(75) Inventors: Minehisa Nagata, Hyogo (JP); Satoshi Tagiri, Osaka (JP); Izumi Usuki, Osaka (JP); Shinya Kemi, Osaka (JP); Hiroaki Niimi, Osaka (JP); Shunsuke Kuhara, Osaka (JP)

(73) Assignee: Panasonic Corporation, Osaka (JP)

( * ) Notice: Subject to any disclaimer, the term of this patent is extended or adjusted under 35 U.S.C. 154(b) by 250 days.

(21) Appl. No.: 11/628,751

(22) PCT Filed: Jun. 10, 2005

(86) PCT No.: PCT/JP2005/010659

§ 371 (c)(1),
(2), (4) Date: Dec. 7, 2006

(87) PCT Pub. No.: WO2005/122418

PCT Pub. Date: Dec. 22, 2005

(65) Prior Publication Data

US 2007/0229278 A1 Oct. 4, 2007

(30) Foreign Application Priority Data

Jun. 10, 2004 (JP) .............................. 2004-172127

(51) Int. Cl.
*H04L 9/32* (2006.01)
*H04M 1/66* (2006.01)
(52) U.S. Cl. .................... 340/10.4; 340/5.8; 340/572.7; 340/572.3; 455/411
(58) Field of Classification Search ................ 340/10.4, 340/10.1, 572.7, 573.4, 572.3, 5.31, 5.8–5.86; 455/411; 713/169; 380/258
See application file for complete search history.

(56) References Cited

U.S. PATENT DOCUMENTS

| 5,117,222 | A | * | 5/1992 | McCurdy et al. .......... 340/573.4 |
| 5,574,431 | A | * | 11/1996 | McKeown et al. ........ 340/572.3 |
| 5,751,223 | A | * | 5/1998 | Turner ..................... 340/10.41 |
| 5,963,144 | A | * | 10/1999 | Kruest ....................... 340/10.1 |
| 6,002,344 | A | | 12/1999 | Bandy et al. |

(Continued)

FOREIGN PATENT DOCUMENTS

CN 1364278 8/2002

(Continued)

OTHER PUBLICATIONS

Miura, JP-09-093156 machine translation, Data Carrier System, Apr. 1997.*

(Continued)

*Primary Examiner*—Davetta W Goins
*Assistant Examiner*—Anne V Lai
(74) *Attorney, Agent, or Firm*—Wenderoth, Lind & Ponack, L.L.P.

(57) ABSTRACT

It is possible to prevent an unauthorized read-out from both active tags and passive tags. Antenna emission is turned on and off by using a switch, or attenuated by using a resistor. A part of the antenna may be chipped. With these configurations, it is possible to lower the emission level of the antenna thus preventing an unauthorized read-out of important information from a remote reader.

11 Claims, 12 Drawing Sheets

U.S. PATENT DOCUMENTS

| | | | |
|---|---|---|---|
| 6,050,622 | A | 4/2000 | Gustafson |
| 6,154,137 | A * | 11/2000 | Goff et al. ................ 340/572.4 |
| 6,378,774 | B1 | 4/2002 | Emori et al. |
| 6,465,880 | B1 | 10/2002 | Dobashi et al. |
| 6,704,608 | B1 | 3/2004 | Azuma |
| 6,744,367 | B1 | 6/2004 | Forster |
| 6,794,000 | B2 * | 9/2004 | Adams et al. .............. 428/40.1 |
| 7,015,794 | B2 * | 3/2006 | Degrauwe et al. ......... 340/10.4 |
| 7,039,392 | B2 * | 5/2006 | McCorkle et al. ........... 455/411 |
| 7,075,435 | B2 * | 7/2006 | Jesser ..................... 340/572.1 |
| 7,095,324 | B2 * | 8/2006 | Conwell et al. .......... 340/572.1 |
| 7,154,449 | B2 * | 12/2006 | Liu et al. .................... 343/867 |
| 7,477,151 | B2 * | 1/2009 | Forster et al. ............ 340/572.3 |
| 2001/0028302 | A1 | 10/2001 | Degrauwe et al. |
| 2002/0016153 | A1 | 2/2002 | Sato et al. |
| 2004/0169080 | A1 | 9/2004 | Azuma |
| 2004/0169081 | A1 | 9/2004 | Azuma |
| 2005/0058292 | A1 * | 3/2005 | Diorio et al. ................ 380/270 |
| 2006/0052069 | A1 * | 3/2006 | Odagiri et al. ........... 455/127.1 |

FOREIGN PATENT DOCUMENTS

| | | |
|---|---|---|
| DE | 197 20 747 | 11/1997 |
| DE | 19653409 | 7/1998 |
| JP | 9-93156 | 4/1997 |
| JP | 2000-137774 | 5/2000 |
| JP | 2001-358611 | 12/2001 |
| JP | 2002-118577 | 4/2002 |
| JP | 2004-15655 | 1/2004 |

OTHER PUBLICATIONS

Supplemental European Search Report issued Nov. 17, 2008 in European Application No. 05750723.8.

Chinese Office Action issued Mar. 27, 2009 in application No. 200580017683.0.

European Office Action issued Jul. 13, 2009 in the corresponding European Application No. 05 750 723.8.

European Office Action issued Jan. 18, 2010 in European Application No. 05 750 723.8.

* cited by examiner

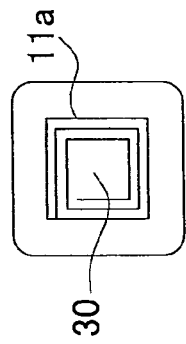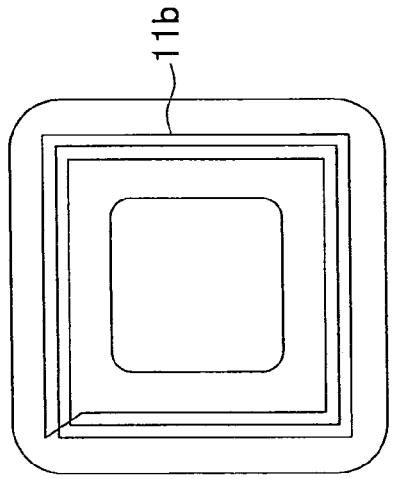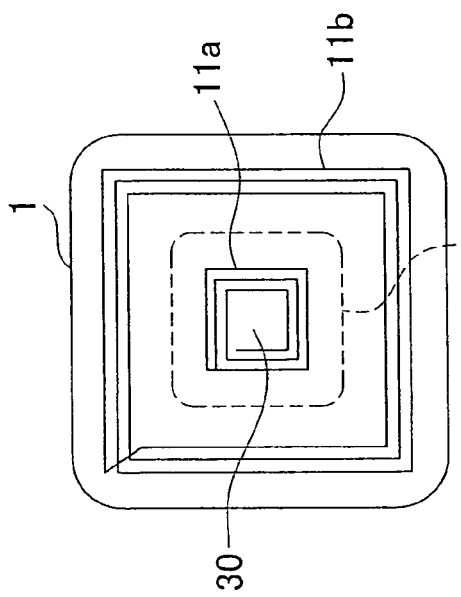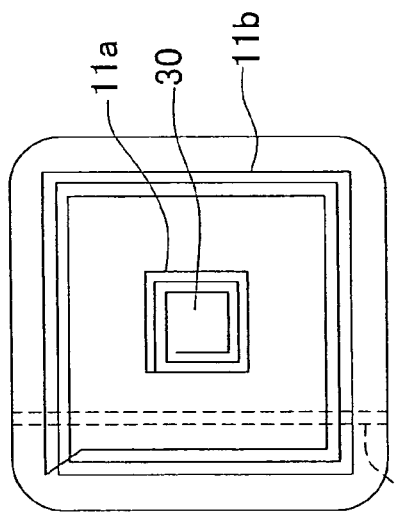
Fig. 9A
Fig. 9B
Fig. 9C
Fig. 9D

RFID TAG AND RFID TAG COMMUNICATION DISTANCE MODIFICATION METHOD

BACKGROUND OF THE INVENTION

1. Field of the Invention

The present invention relates to RFID tags which are attachable to products, cards, etc.

2. Background Art

Recently, various usages of RFID tags have been proposed. One proposal is, for example, to attach radio tags to products so that inventory control and distribution management can be done without a need of personnel. Utilizing RFID tags for controlling food in a home refrigerator has also been proposed.

Meanwhile, as usage of RFID tags diversifies, problems associated with it have arisen. A privacy issue discussed below is pointed out as one of such problems. Namely, because information in a RFID tag can be read from places apart from the tag, it is possible that what is inside one's bag is known by a third party or one's behavior is tracked based on information that the tag transmits. In order to solve the aforementioned problem, Patent Document 1, for example, proposes a method for protecting information in a tag by varying communication distance of an active tag.

An active tag disclosed in Patent Document 1 includes a battery for powering the various electronic circuits, amplifying means, a demodulator for demodulating incoming signals and a data processing unit. The demodulator includes validating means for validating the data included in the incoming signals. The data processing unit includes a circuit for controlling maximum communication distance between the tag that transmits signals at a predetermined power and a reader. This circuit transmits signals for varying a gain of the amplifying means or a reference voltage of the validating means to control the maximum communication distance.

Patent Document 1: Japanese Patent Laid-open No. 2001-358611

SUMMARY OF THE INVENTION

However, the invention disclosed in Patent Document 1 is directed to active tags, and the communication distance between the tag and the reader is controlled by varying the gain of the incoming signals based on the signals transmitted from the circuit. Such a configuration cannot be applied to passive tags. In other words, a configuration for varying the communication distance between a passive tag and a reader/writer is not proposed in Patent Document 1. Also, because an active tag requires a battery and an amplifying means, the tag itself will be high in costs.

The active tag according to the aforementioned invention controls the gain of the incoming signals according to an operating mode. Therefore, a reader may not receive necessary data, which the reader is supposed to receive from a tag, from the tag when shortening the communication distance between the tag and the reader/writer.

It is an object of the present invention to provide a technology enabling adjustment of the communication distance between both an active tag and a passive tag, and a reader/writer.

It is another object of the present invention to provide a technology whereby reliability of communication between a tag and a reader/writer is guaranteed while controlling the communication distance.

In order to solve the aforementioned problems, a first invention provides an RFID tag that stores data. This RFID tag comprises the following elements:

a first antenna for transmitting radio waves;

transmission means for generating a transmission signal by modulating the data, and providing the transmission signal to the first antenna; and emission control means for controlling an output power of the first antenna in order to transmit the transmission signal, the emission control means being connected to the first antenna and the transmission means.

Conceivably, the emission control means is configured to selectively use a plurality of resistors, to selectively use a plurality of antennas, or to turn provision of data to the first antenna on and off. Also, by forming a broken line for chipping a part of a coil antenna printed on a film, the output power of the first antenna will be zero when the film is torn along the broken line to destroy the first antenna. In either case, the output power of the first antenna can be adjusted for both an active tag and a passive tag.

An RFID tag having such a configuration can shorten the transmission distance of the transmitted radio waves from the first antenna, for example, by attenuating the output power, thus an unauthorized read-out of the data from a remote place is prevented.

When the first antenna receives the radio waves, the received radio waves may be provided to receiving means via the emission control means. Here, the receiving means has a function for obtaining received data by demodulating the radio waves. An unauthorized write-in from a remote place using powerful radio waves will thus be prevented by controlling power of received radio waves.

A second invention provides the RFID tag according to the first invention, wherein the emission control means has the following means:

attenuation means for attenuating the output power of the first antenna; and attenuation control means for controlling attenuation of the output power by the attenuation means.

The attenuation means may be, for example, a plurality of resistors or a variable resistor. In accordance with the output power of the first antenna, the attenuation control means selects or switches between the resistors, or adjusts the resistance value of the variable resistor. For a passive tag, reflected waves of the radio waves from a reader are used for transmitting data from the tag to the reader. A passive tag employing a backscattering method can attenuate the output power by adjusting a resistance value of a resistor connected in parallel with the first antenna to adjust a match/mismatch of impedance.

A third invention provides the RFID tag according to the second invention wherein the attenuation means includes a plurality of resistors. In such an RFID tag, the attenuation control means connects the transmission means and the first antenna via at least one of the plurality of resistors.

A passive tag employing the backscattering method can attenuate the output power of the first antenna by adjusting the resistance value of the resistor connected in parallel with the first antenna to adjust the match/mismatch of impedance. For example, the transmission distance of the radio waves can be shortened by selecting a resistor R1 with a small impedance mismatch to reduce the reflected waves. On the other hand, the transmission distance of the radio waves can be extended by selecting a resistor R2 with a large impedance mismatch to increase the reflected waves. Therefore, an unauthorized read-out of data from a remote place will be prevented by selecting a resistor to attenuate the output power of the first antenna.

A fourth invention provides the RFID tag according to the second invention wherein the attenuation means includes a variable resistor connected between the transmission means and the first antenna. In such an RFID tag, the attenuation control means adjusts the resistance value of the variable resistor.

A passive tag employing the backscattering method can attenuate the output power of the first antenna by adjusting the resistance value of the resistor connected in parallel with the first antenna to adjust the match/mismatch of impedance. For example, the reflected waves will be reduced and thus the transmission distance of the radio waves can be shortened by adjusting the resistance value of the variable resistor to R1 which reduces the impedance mismatch. On the other hand, the reflected waves will be increased and thus the transmission distance of the radio waves can be extended by adjusting the resistance value of the variable resistor to R2 which increases the impedance mismatch. Therefore, an unauthorized read-out of data from a remote place will be prevented by adjusting the resistance value to attenuate the output power of the first antenna.

A fifth invention provides the RFID tag according to the first invention wherein the emission control means has connection control means for disconnecting a connection between the first antenna and the transmission means.

Provision of data to the antenna can be stopped, for example, by using switching means such as a switch. Also, by forming a broken line between an IC chip printed on a film and a coil antenna, a connection between the transmission means included in the IC chip and the antenna will be disconnected when the film is torn along the broken line.

A sixth invention provides the RFID tag according to the fifth invention wherein the connection control means includes switching means for switching the connection between the transmission means and the first antenna ON and OFF.

Such a switch can connect or disconnect the transmission means and the antenna. As a result, flexibility of adjusting the output power will be enhanced.

A seventh invention provides the RFID tag according to the fifth or sixth invention, and the RFID tag further comprises a second antenna for transmitting radio waves at an output power different from the output power of the first antenna, the second antenna being connected to the transmission means via the emission control means.

This RFID tag can prevent an unauthorized read-out of data from a remote place by choosing between the antennas. For example, by using a switch as the connection control means, provision of data to at least one antenna will be stopped. Of course, there may be cases where provision of data to all the antennas is stopped. An unauthorized write-in from a remote place will thus be prevented by choosing between the antennas to select not only the power of transmitted radio waves but also the power of received radio waves.

Another example of the connection control means may have the following configuration. A premise is that the RFID tag comprises a first antenna electrically connected to an IC chip including the transmission means, and a second antenna magnetically coupled to the first antenna. The IC chip, the first antenna and the second antenna are formed on a film, and a broken line is formed between the first antenna and the second antenna. By tearing the film along the broken line, the second antenna is removed from the RFID tag so that the connection between the IC chip and the second antenna is disconnected. Such a configuration that enables removal of the second antenna may be one example of other configuration examples of the connection control means.

A specific example of the first antenna may be an on-chip coil that is electrically connected to the IC chip. A specific example of the second antenna may be a coil antenna that is magnetically coupled to the on-chip coil therearound. Because such a film type RFID tag is usually adhered to an article, it would be easier to tear the second antenna off by applying different adhesiveness on the back side of the portion to be torn off from the rest of the tag.

An eighth invention provides the RFID tag according to the first invention, the RFID tag further comprising determination means for determining the value of the output power of the first antenna. In this RFID tag, the emission control means controls the output power of the first antenna based on the value determined by the determination means.

The determination means may read out the value of the output power stored in storage means or determine the value in accordance with a predetermined event. For example, the value of the output power may be set in accordance with an authentication result by the RFID tag that authenticates the reader. Conceivably, the determination means may determine the value of the output power based on whether or not a tag ID is included in data that the RFID tag receives or based on importance of data to be transmitted. In the case of determining the value of the output power based on the stored values of output power, the value of the output power may be written into the storage means externally. For example, the value of the output power may be written into the RFID tag from a writer provided at a gate for a predetermined area. A CPU included in the IC chip of the RFID tag makes it possible to determine the value of the output power in various ways thus enabling flexible control of the output power.

A ninth invention provides the RFID tag according to the eighth invention, the RFID tag further comprising storage means for storing values of output powers of the first antenna. In this RFID tag, the determination means determines the output power based on the values stored in the storage means.

It will become easier to protect important information in the tag from being illegally read out from a remote place by adjusting the output power of the antenna based on the values stored in the tag.

A tenth invention provides the RFID tag according to the eighth invention, the RFID tag further comprising authentication means for authenticating an external device to which the radio waves from the first antenna are transmitted. In this RFID tag, the determination means determines the value of the output power according to an authentication result determined by the authentication means.

For example, radio waves may be increased for the authenticated reader and reduced for the unauthenticated reader. With this configuration, an unauthorized read-out of data will be prevented while ensuring communication of necessary data.

More specifically, the determination means limits the value of the output power to "low" in the case of an unauthenticated reader. Thereby, an electromotive force in the RFID tag will increase and start an authentication circuit in the tag. The determination means changes the value of the output power to "high" when the authentication circuit authenticates the reader. Thereby, a flexible processing using the RFID tag becomes possible by securing long communication distance after the authentication, as well as making it much harder for an unauthenticated reader at a remote place to illegally read out authentication information.

Let us assume that the aforementioned configuration is applied to a bracelet type tag. An authentication is performed by contacting the tag to a reader. When an authentication result is "OK", the reader detects a login. As long as the authenticated reader detects the tag in a given area, it maintains the login. When the tag is no longer detected, it is assumed that the tag has logged out.

An eleventh invention provides the RFID tag wherein the determination means determines the value of the output power according to an attribute of the data.

For example, the value of the output power may be set to "low" when transmitting highly confidential information, and "high" when transmitting information with low confidentiality. Thus, an unauthorized read-out of important information will be prevented. Similarly, an unauthorized write-in to important data from a remote place will be prevented by adjusting the received emission level in accordance with the kind of data to be received. In performing this processing, attributes of data such as degree of confidentiality, expiration date, a degree of openness are correlated with the data and stored.

A twelfth invention provides the RFID tag according to the eighth invention wherein the first antenna further receives radio waves. This RFID tag further comprises receiving means for obtaining received data by demodulating the radio waves received by the first antenna. Also in this tag, the determination means determines the value of the output power based on the received data.

For example, when the RFID tag receives a command transmitted by a reader whose tag ID is not recognized, the determination means decides the value of the output power to be "low". On the other hand, when the RFID tag receives a command including specification of tag ID, the determination means decides the value of the output power to be "high". In other words, the reader whose tag ID is recognized is considered to be an authorized external device. With this configuration, the communication distance to a possibly unauthorized external device can be limited without limiting the communication distance to the authorized external device.

A thirteenth invention provides the RFID tag according to the eighth invention that further comprises setting-receiving means for receiving settings of the values of the output power from the external device. In this tag, the determination means determines the value of the output power based on the received settings of the values.

The settings of emission level may be received externally and the value of the output power may be determined based on them. For example, the first antenna is a UHF-band antenna for a long distance and the second antenna is a 13.5 MHz-band antenna for a short distance. The determination means receives from an external device settings regarding ON/OFF of the first antenna for a long distance, and switches the first antenna on or off. Before switching the first antenna on or off, the external device may be authenticated and the first antenna may be switched on or off based on an authentication result.

The following application example is given. The RFID tag is attached to a student's bag and the reader/writer is set up at a school entrance. When the student arrives at the school, the RFID tag authenticates the reader/writer and switches the first antenna for a long distance on in accordance with the settings from the reader/writer. When the student leaves the school, the RFID tag authenticates the reader/writer and switches the first antenna for a long distance off according to the settings from the reader/writer. With this configuration, the student's RFID tag is prevented from being illegally read out or written in from a remote place.

The RFID tag of the present invention is capable of preventing an unauthorized read-out of data from a remote place by controlling the emission level. Also, this configuration can be applied to both active and passive tags.

BRIEF DESCRIPTION OF THE DRAWING

FIG. 9 is an explanatory diagram showing another example of a control of transmitted emission using the RFID tag having a plurality of antennas.

DETAILED DESCRIPTION OF THE PRESENT INVENTION

First Embodiment (1) Configuration

Figure 1:
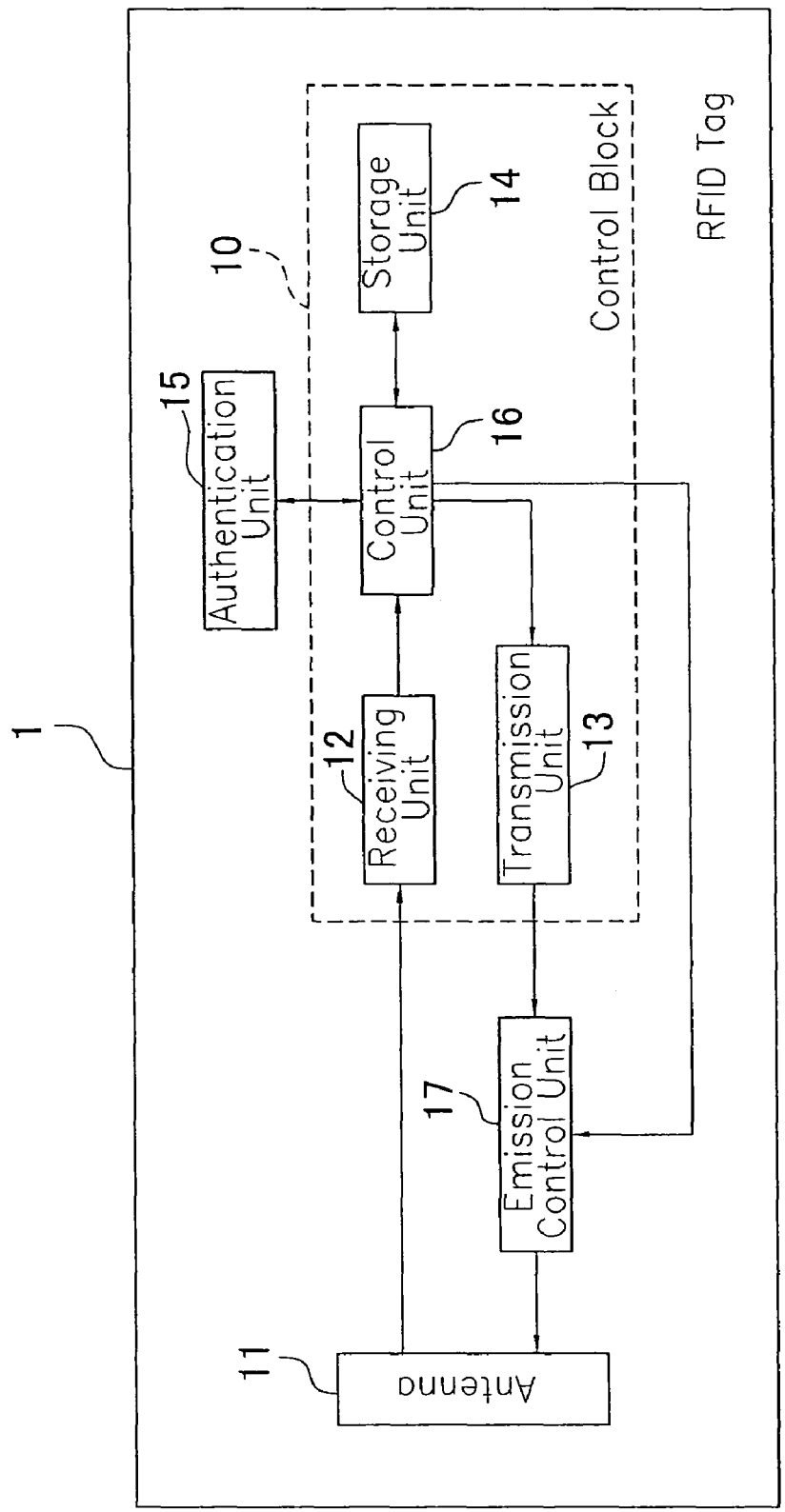
FIG. 1 is a block diagram of an RFID tag according to the first embodiment.

FIG. 1 is a block diagram of an RFID tag according to the first embodiment of the present invention. An RFID tag 1 has an antenna 11 (corresponding to the first antenna), a receiving unit 12 (corresponding to the receiving means and the setting-receiving means), a transmission unit 13 (corresponding to the transmission means), a storage unit 14 (corresponding to the storage means), an authentication unit 15 (corresponding to the authentication means), a control unit 16 (corresponding to the determination means) and an emission control unit 17 (corresponding to the emission control means). Hereinafter, the receiving unit 12, the transmission unit 13 and the storage unit 14 may be collectively called a control block 10. The antenna 11 is achieved by an on-chip coil or a coil, and the control block 10 and the authentication unit 15 is achieved by an electric circuit such as an IC chip having a CPU.

The antenna 11 transmits and receives radio waves.

The receiving unit 12 obtains received data by demodulating a signal received by the antenna 11, and provides it with the control unit 16.

The transmission unit 13 generates a transmission signal by modulating data read from the storage unit 14 or transmission data such as a processing result of the received data, and provides the transmission signal to the antenna 11 via the emission control unit 17.

The storage unit 14 stores various data such as a tag ID that identifies an RFID tag, product information and user information. The stored data may include attributes of data, for example, data kind, degree of importance, confidentiality and openness, and expiration date, etc. The storage unit 14 may also store settings of emission levels to control the output power of the antenna 11. By adjusting the output power of the antenna 11 based on the settings stored in the tag, it will be easier to prevent important information in the tag from being illegally read out from a remote place. The settings of levels in the storage unit 14 may be prestored therein or may be written into from a reader/writer outside the tag. For example, the settings of emission levels may be written into the storage unit 14 of the RFID tag from a writer set up at a gate of a given area.

The authentication unit 15 authenticates a reader/writer of the RFID tag based on the received data.

The control unit 16 writes data into the storage unit 14 in accordance with a command included in the received data or reads out data from the storage unit 14 and passes it to the transmission unit 13. The control unit 16 may also determine the value of the output power of the antenna 11 and notify it to the emission control unit 17. Note that a method for determining the value of the output power, in other words the value of the emission level, is not particularly limited. Specifically, the control unit 16 may read out a value of output power stored in the storage unit 14 and decide it to be the value of the output power, or determine the value of the output power according to a predetermined event. One example of determining the emission level according to a predetermined event is to set the emission level according to an authentication result from the authentication unit 15 authenticating a reader/writer. Another example is that the emission level is determined according to whether or not a tag ID is included in data that the RFID tag receives, or attribute information of data to be transmitted. The control unit 16 may also update values of emission levels stored in the storage unit 14 using the aforementioned methods. Flexible control of the emission level becomes possible by determining the value of the output power by various methods performed by the control unit 16. Methods for determining the emission level will be described more in detail below (see (3) Determining the emission level).

The emission control unit 17 is connected to the antenna 11 and the transmission unit 13, and controls the output power of the antenna 11. The emission control unit 17 may have a configuration in which the output power of the antenna 11 is controlled by an external operation, or may control the output power of the antenna 11 based on the value of the output power that the control unit 16 determined. Conceivably, the emission control unit 17 is configured to selectively use a plurality of resistors or to turn provision of the transmission signal to the first antenna 11 on and off. In either case, the output power of the antenna 11 can be adjusted and the transmission distance can be shortened for both an active tag and a passive tag. As a result, an unauthorized read-out of data from a remote place will be prevented. Specific configurations of the emission control unit 17 will be described more in detail below.

(2) Emission Control Unit Configuration (2-1) ON/OFF of the Data Provision to Antenna 11

Figure 2:
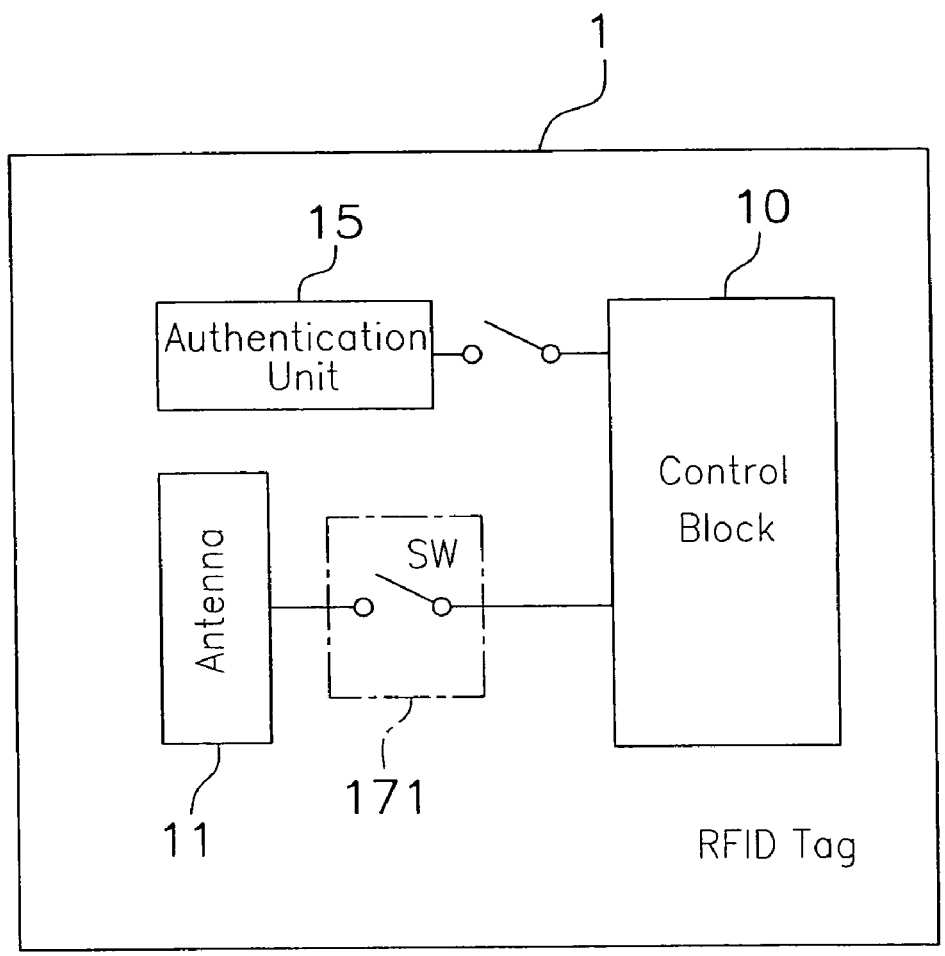
FIG. 2 is an explanatory diagram showing a configuration example of an emission control unit of FIG. 1.

FIG. 2 is an explanatory diagram showing one specific configuration example of an emission control unit 17. The elements in FIG. 2 that are identical to the elements shown in FIG. 1 are identified by the same reference numerals.

An emission control unit 17 has a connection control unit 171 for disconnecting the connection between the antenna 11 and the transmission unit 13. As shown in FIG. 1, the transmission unit 13 is included in the control block 10. In this example, the connection control unit 171 includes a switch SW. For example, the connection control unit 171 provides or stops providing the transmission signal to the antenna 11 by opening and closing the switch based on an instruction from the control unit 16.

The switch SW may be replaced with the following configuration. In the case of a film type RFID tag on which an IC chip including an element other than the antenna 11 is mounted, and the antenna 11 is printed, a broken line may be formed between the IC chip and the antenna 11 as the connection control unit 171. By manually tearing the film along the broken line, the connection between the transmission means in the IC chip and the antenna 11 is disconnected. If the broken line is formed in a way that a part of the antenna 11 is chipped by tearing the film along the line, the emission level will be zero with the antenna 11 being destroyed.

The aforementioned connection control unit 171 can be applied to both active tags and passive tags. Of course, configurations of the connection control unit 171 are not limited to the aforementioned examples.

(2-2) Attenuation of Transmission Signal by Resistors

Figure 3A:
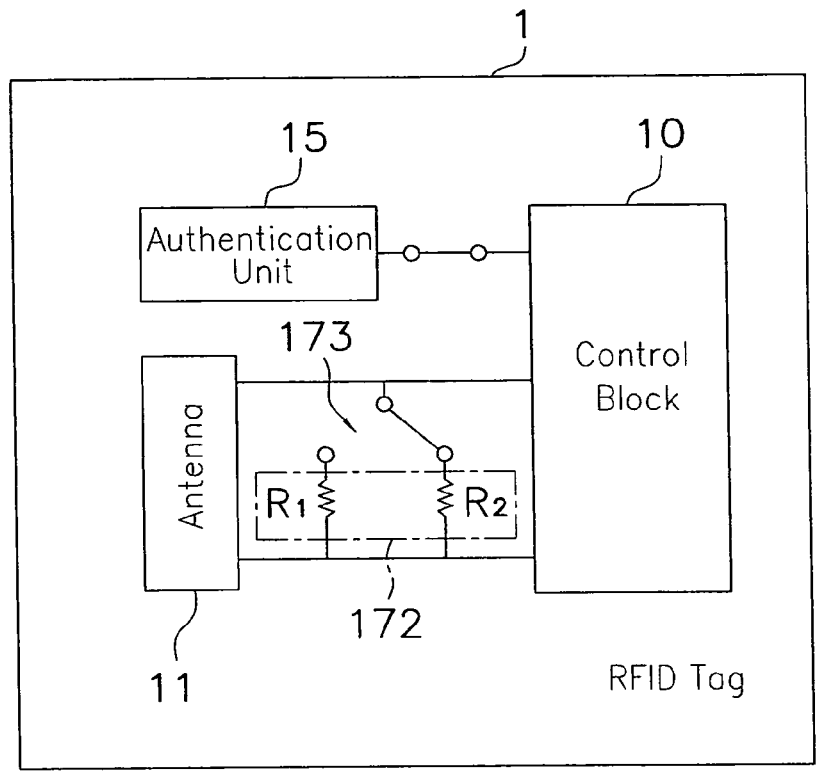
FIG. 3 is an explanatory diagram of another configuration example of the emission control unit of FIG. 1.
Figure 3B:
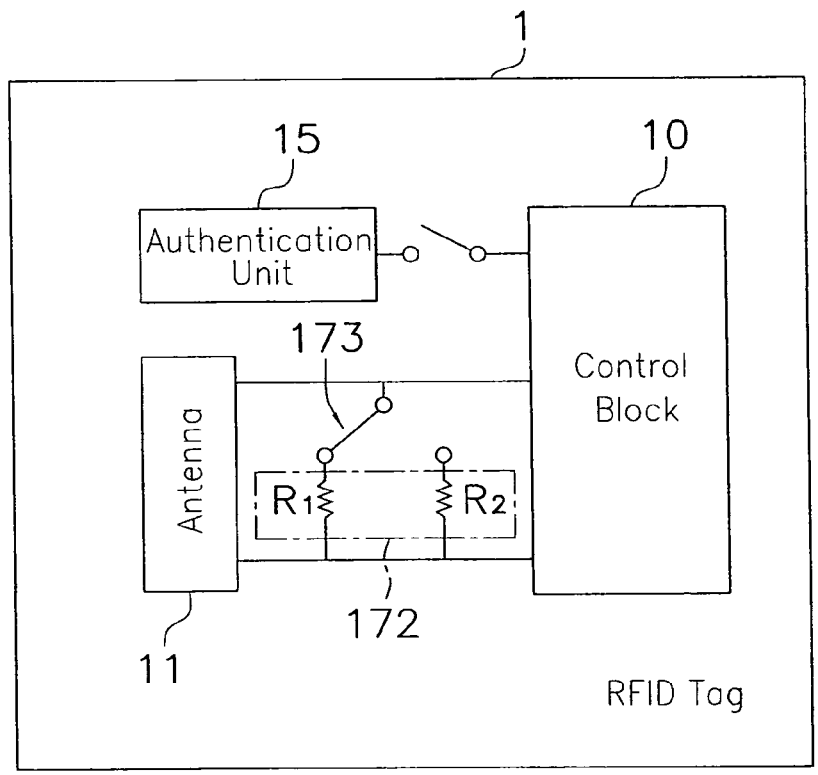

FIG. 3 is an explanatory diagram showing another configuration example of the emission control unit 17. The elements in FIG. 3 that are identical to the elements shown in FIG. 1 are identified by the same reference numerals.

The emission control unit 17 has an attenuation unit 172 for attenuating the output power of the antenna 11 and attenuation control unit 173 for controlling attenuation of the output power by the attenuation unit 172.

The attenuation unit 172 in this example includes a plurality of resistors R1 and R2 that are connected to the control block 10 and the antenna 11 in parallel. The attenuation control unit 173 in this example includes a switch SW. The attenuation control unit 173 connects the transmission unit 13 and the antenna 11 via at least one of the resistors R1 or R2. The attenuation control unit 173 selects or switches between the resistors in accordance with the value of the output power instructed by the control unit 16.

This configuration may be applied to active tags but preferably applied to passive tags. For passive tags, load modulation using the reflected waves of radio waves from the reader is employed when transmitting data from the RFID tag to the reader. A passive tag employing the load modulation method can attenuate the emission level by selecting or switching between the resistors R1 or R2 connected in parallel to the antenna 11 to adjust the match/mismatch of impedance. The same effect may be achieved by selecting or switching between the resistive loads used for the load modulation instead of selecting or switching between the resistors connected in parallel to the antenna 11.

For example, let us assume that the impedance mismatch between the antenna 11 and the control block 10 is smaller when using the resistor R2 than when using the resistor R1. In this case, by the attenuation control unit 173 selecting the resistor R2, the reflected waves will be reduced thus shortening the transmission distance of radio waves. Thus, as shown in FIG. 3(*a*), when authenticating a reader/writer outside the tag, electricity for starting up the authentication unit 15 may be retained by selecting the resistor R2. On the other hand, by the attenuation control unit 173 selecting the resistor R1, the reflected waves will be increased thus extending the transmission distance of radio waves. Thus, as shown in FIG. 3(*b*), when authentication is not necessary, electricity may be used for transmitting the data by selecting the resistor R1. Note that the number of resistors and resistance values are adjustable as necessary.

A variable resistor connected between the transmission unit 13 and the antenna 11 in parallel may be used as the attenuation unit 172 instead of using a plurality of resistors. In this case, the attenuation control unit 173 adjusts the resistance value of the variable resistor in accordance with an instruction of the control unit 16. Adjusting the resistance value of the variable resistor will have the same effect as using the plurality of resistors R1 and R2.

(3) Determining the Emission Level (3-1) Determining the Emission Level Based on Stored Settings In the case where the storage unit 14 stores settings for the value of output powers, the control unit 16 may determine the value of the output power based on the settings. By adjusting the output power of the antenna 11 based on the stored values of output powers, important information in the tag will advantageously be prevented from being illegally read out from a remote place.

(3-2) Determining the Emission Level Based on an Authentication Result

The control unit 16 may determine the output power of the antenna 11 in accordance with an authentication result by the authentication unit 15 authenticating an external reader/writer. For example, the control unit 16 may set the value of the output power of the antenna 11 to be high for an authenticated reader and low for an unauthenticated reader. With this configuration, an unauthorized read-out of data will be prevented while ensuring communication of necessary data.

When the RFID tag is a passive tag, the control unit 16 may first set the value of the output power to the reader to "low". Thereby, an electromotive force in the RFID tag will increase and starts an authentication unit 15 in the tag. The control unit 16 changes the value of the output power to "high" when the reader is authenticated by the authentication unit 15. Thereby, a flexible and secure communication using the RFID tag becomes possible while preventing authentication information from being illegally read out by an unauthorized reader from a remote place as well as securing long communication distance after the authentication.

Let us assume that the aforementioned configuration is applied to a bracelet type RFID tag that a user can wear. An authentication process for a reader is performed near the RFID tag and if the reader is authenticated, the RFID tag will log in a given area that the reader is set up. As far as the authenticated RFID tag is detecting the RFID tag, the log-in of the RFID tag is maintained in that area. When the RFID tag is no longer detected by the reader, it is assumed that the tag has logged out. With this configuration, smooth log-ins and log-outs by the RFID tag can be achieved while preventing a leakage of authentication information used for the authentication process.

Note, with regard to power of the received radio waves, that powerful received radio waves may be received from the authenticated external reader/writer. Thereby, a write-in of unauthorized data from a remote place will be prevented.

(3-3) Determining the Emission Level Based on Transmission Data

The control unit 16 may determine the value of the output power of the antenna 11 according to the attributes of transmission data. Take an example where degree of confidentiality of data in the storage unit 14 is correlated with the data and stored therein. When transmitting highly confidential data, the control unit 16 sets the value of the output power to "low". When transmitting data with low confidentiality, the control unit 16 sets the value of the output power to "high". Thereby, an unauthorized read-out of important information will be prevented.

Take another example where data and its kind are correlated and stored in the storage unit 14. Examples of data kind include "product information" and "user information". The control unit 16 may set the value of the output power to "low" when transmitting the user information and "high" when transmitting the product information. In this way, an unauthorized read-out of data relating to the privacy of user from a remote place will be prevented. By using data attributes as needed, the output power of the antenna 11 can be changed flexibly according to the transmission data.

(3-4) Determining the Emission Level Based on Received Data

The control unit 16 may determine the value of the output power of the antenna 11 based on the received data received by the receiving unit 12. For example, in the case where the receiving unit 12 receives a command that does not include a tag ID from a reader, the control unit 16 may determine the value of the output power to be "low" because the reader is possibly unauthorized. On the other hand, in the case where the receiving unit 12 receives a command that includes a tag ID from a reader, the control unit 16 may determine the value of the output power to be "high". In other words, the reader whose tag ID is recognized will be considered as an authorized reader. In this way, data is prevented from being read out by a possibly unauthorized external device from a remote place without limiting the communication distance to an authorized reader.

Other than the aforementioned configuration, the output power of the antenna 11 can flexibly be changed depending on the received data by interpreting the received data in accordance with the needs. For example, the output power of the antenna 11 may be changed in accordance with the kind of command to be received or a source of command. The output power of the antenna 11 may also be changed in accordance with various data values indicating the surrounding environment such as temperature, illuminance, humidity, precipitation, density, pollen level and dust level.

(3-5) Determining the Emission Level Based on External Settings

There are cases where the receiving unit 12 receives settings of the values of output power from an external reader/writer. In such cases, the control unit 16 may determine the value of the output power of the antenna 11 based on the received emission level. For example, the receiving unit 12 receives setting commands indicating the value of the output power or ON/OFF of the antenna 11 from the external reader/writer. Preferably, the control unit 16 changes the output power or switches between ON and OFF of the antenna 11 when the reader/writer is authenticated by the authentication unit 15. Instead of the aforementioned configuration in which the authentication unit 15 performs authentication, a configuration in which the setting commands include a tag ID of the RFID tag may also be possible.

The following application example is given. The RFID tag is attached to a student's bag and the reader/writer is set up at a school entrance. When the student arrives at the school, the RFID tag authenticates the reader/writer and switches the antenna 11 on in accordance with the settings from the reader/writer. When the student leaves the school, the RFID tag authenticates the reader/writer and switches the first antenna 11 off according to the settings from the reader/writer. With this configuration, for example, the student's location on the school premises can be known using the student's RFID tag. On the other hand, the student's RFID tag is prevented from being illegally read out or written in outside the school.

Similarly, settings of the power of received radio waves may be accepted and the radio waves may be received in accordance with the settings.

Figure 4:
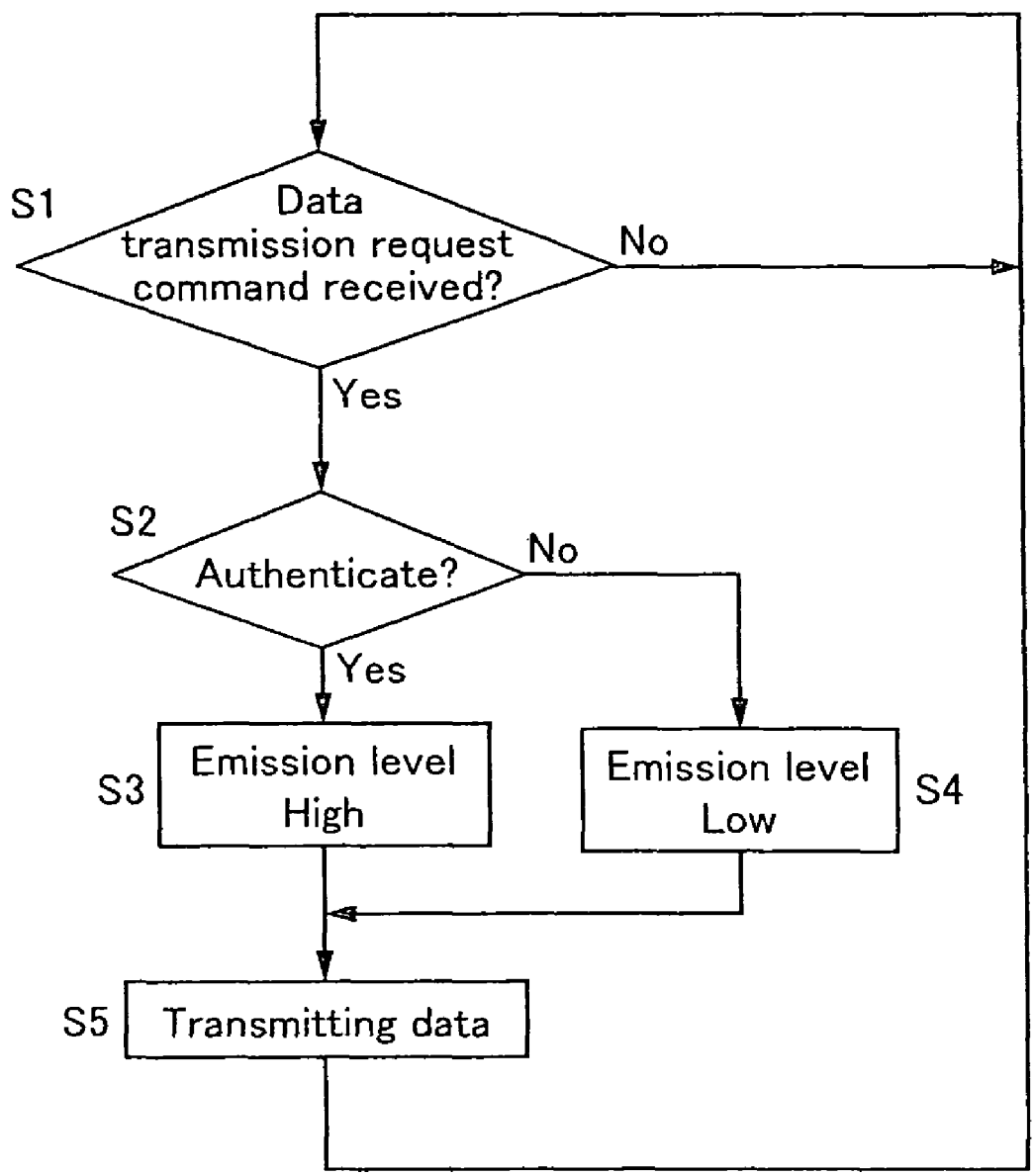
FIG. 4 is a flow chart showing a processing example performed by the RFID tag shown in FIG. 1.

(4) Processing (4-1) Example of Controlling the Emission Based on Authentication Result FIG. 4 is a flow chart showing a processing example performed by an RFID tag 1 shown in FIG. 1. In order to facilitate the explanation, an example is taken where the value of output power of the antenna 11 is determined according to an authentication result of the authentication unit 15, but a method for determining the value of output power of an antenna 11 is not limited to this example. It has already been stated above that the emission level of the antenna 11 can be controlled by the external operation.

Step S1: A control unit 16 waits for receipt of any data via a receiving unit 12. Upon the receipt of data, the control unit 16 judges whether or not the data includes a data transmission request command to the RFID tag 1. When the transmission request command is received, the flow moves to step S2. If the transmission request command is not received, the flow moves back to step S1 and waits for receipt of the transmission request command.

Step S2-S3: The control unit 16 passes the received data to the authentication unit 15 and instructs authentication of a request source reader. Further, the control unit 16 obtains a determination result from the authentication unit 15. If the request source reader is authenticated (S2), the control unit 16 instructs an emission control unit 17 to set the value of output power of the antenna 11 to "high" (S3). Upon this instruction, the emission control unit 17 performs a control such as closing a switch, selecting a resistor or switching between the resistors.

Step S4: If the request source reader is not authenticated (S3), the control unit 16 instructs the emission control unit 17 to set the value of the output power to "low" (S4). Upon this instruction, the emission control unit 17 performs a control such as opening the switch, selecting a resistor or switching between the resistors.

Step S5: The control unit 16 reads out the requested data from a storage unit 14 and transmits the data from the antenna 11 via a transmission unit 13 and the emission control unit 17.

An unauthorized read-out of data by an unauthenticated reader will thus be prevented by changing, in accordance with the authentication result of a reader, the output power of the antenna 11 used for transmitting data.

Figure 5:
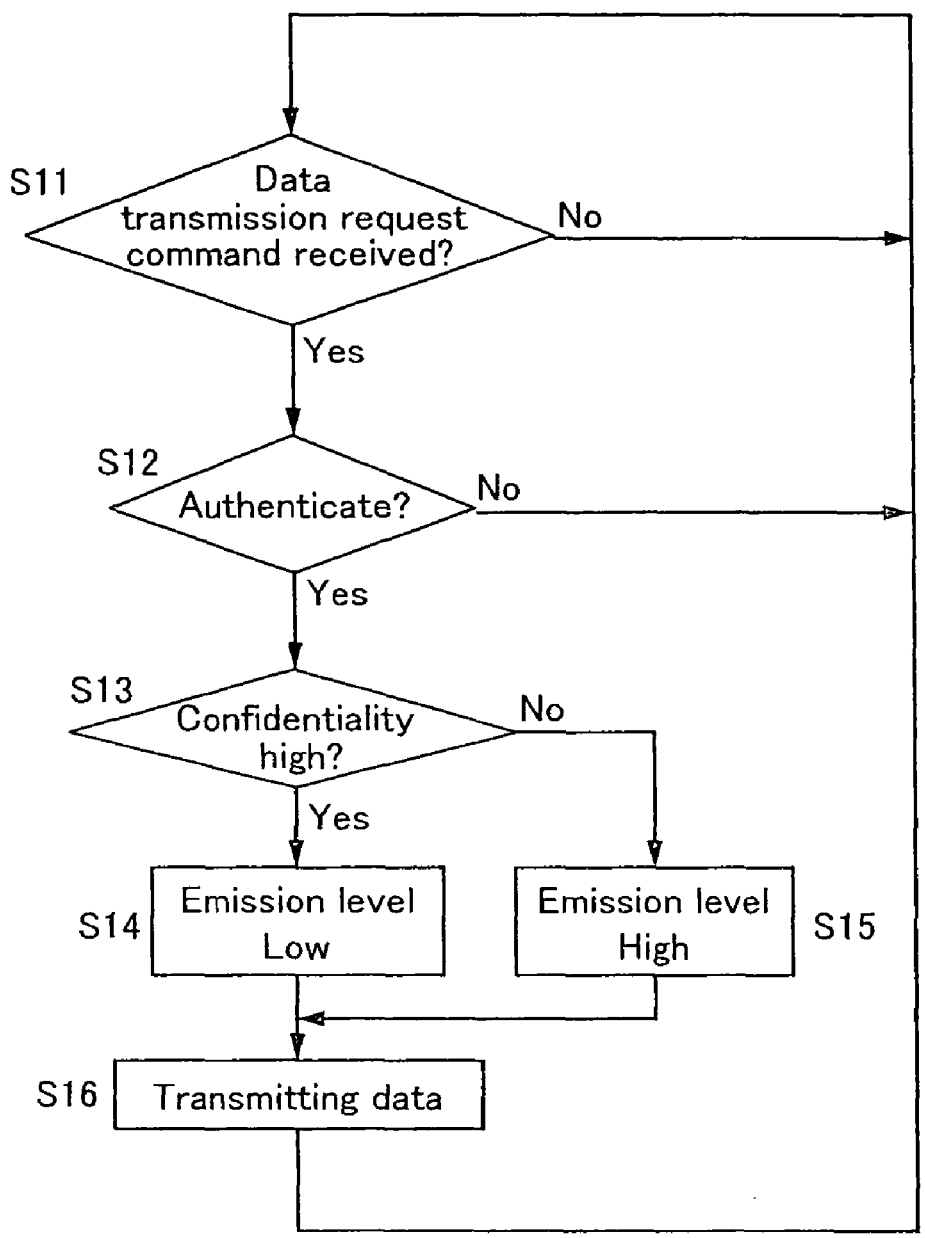
FIG. 5 is a flow chart showing another processing example performed by the RFID tag shown in FIG. 1.

(4-2) Example of Controlling the Emission Based on Attributes of Transmission Data FIG. 5 is a flow chart showing another processing example performed by the RFID tag 1 shown in FIG. 1. In order to facilitate the explanation, an example is taken where the value of the output power of the antenna his determined according to the attributes of transmission data. Here, degree of "confidentiality" is considered as an attribute of transmission data.

Step S11: A control unit 16 waits for receipt of any data via the receiving unit 12. Upon the receipt of data, the control unit 16 judges whether or not the data includes a data transmission request command to the RFID tag 1. When the transmission request command is received, the flow moves to step S12. If the transmission request command is not received, the flow moves back to step S11 and waits for receipt of the transmission request command.

Step S12-S13: The control unit 16 passes the received data to the authentication unit 15 and instructs to authenticate a request source reader. Further, the control unit 16 obtains a determination result from the authentication unit 15. If the request source reader is authenticated (S12), the control unit 16 reads out the requested data and its degree of confidentiality from the storage unit 14, and determines whether or not the degree of confidentiality of the requested data is high (S13).

Step S14: When the degree of confidentiality of the requested data is high, the control unit 16 instructs the emission control unit 17 to set the value of the output power to "high". Upon this instruction, the emission control unit 17 performs a control such as closing a switch, selecting a resistor or switching between the resistors.

Step S15: When the degree of confidentiality of the requested data is low, the control unit 16 instructs the emission control unit 17 to set the value of the output power to "low". Upon this instruction, the emission control unit 17 performs a control such as opening the switch, selecting a resistor or switching between the resistors.

Step S16: The control 16 transmits the data from the antenna 11 via the transmission unit 13 and the emission control unit 17.

With the aforementioned configuration, data can be transmitted depending on a security level required by the data and the security for data can thus be guaranteed by changing the output power of the antenna 11 used for transmitting data in accordance with the attributes of data to be transmitted.

Note that the aforementioned processings are only examples of the processing performed by the RFID tag because the processing changes depending on how the value of the output power of the antenna 11 is determined.

(5) Effects

The RFID tag according to the first embodiment attenuates the transmission signal of the antenna 11 using the resistors, or turns provision of the transmission signal to the antenna 11 on and off by using a means such as a switch. Therefore, the emission level, i.e. the output power of the antenna 11, can be adjusted regardless of active tags or passive tags.

For a film type RFID tag on which an IC chip is mounted and an antenna 11 is printed, a broken line may be used as the emission control unit 17 for disconnecting a connection between the antenna 11 and the IC chip. The output power of the antenna 11 can thus be adjusted externally.

Also, by adjusting the output power based on the stored values of output power, authentication result of the reader, the attributes of transmission data, received data, external settings, etc., convenience of communication between the RFID tag and the reader/writer will be guaranteed while flexibly adjusting the transmission distance from the antenna 11 and improving the security for the data stored in the tag.

Second Embodiment (1) Configuration

Figure 6:
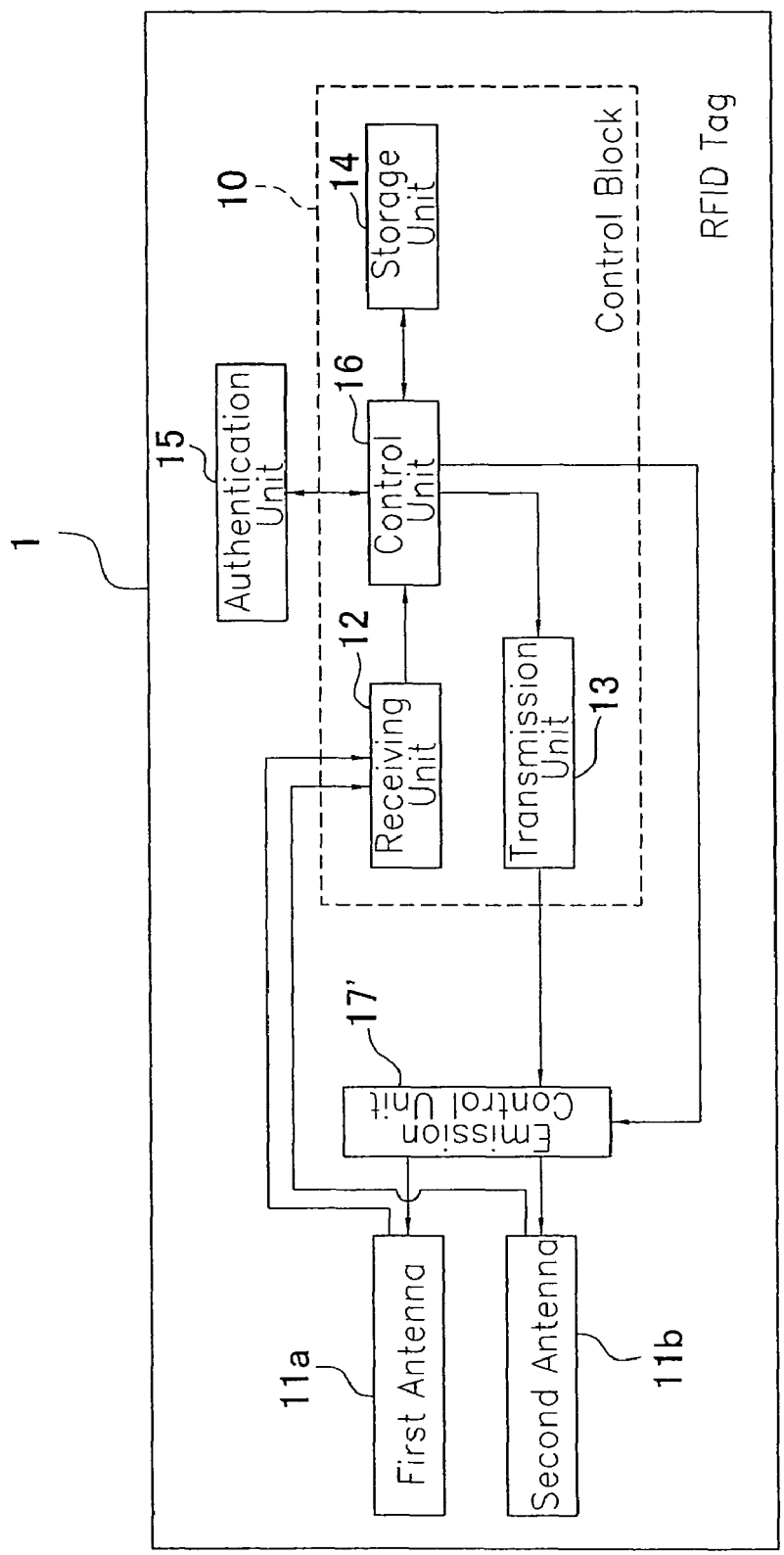
FIG. 6 is a block diagram of a configuration of an RFID tag according to the second embodiment.

FIG. 6 is a block diagram showing a configuration of an RFID tag according to the second embodiment. A configuration of an RFID tag 1' is identical with that of the first embodiment except that it has a plurality of antennas 11a and 11b (corresponding to a first antenna and a second antenna). The elements in FIG. 6 having the same function as those in FIG. 1 are identified by the same reference numerals.

Figure 7:
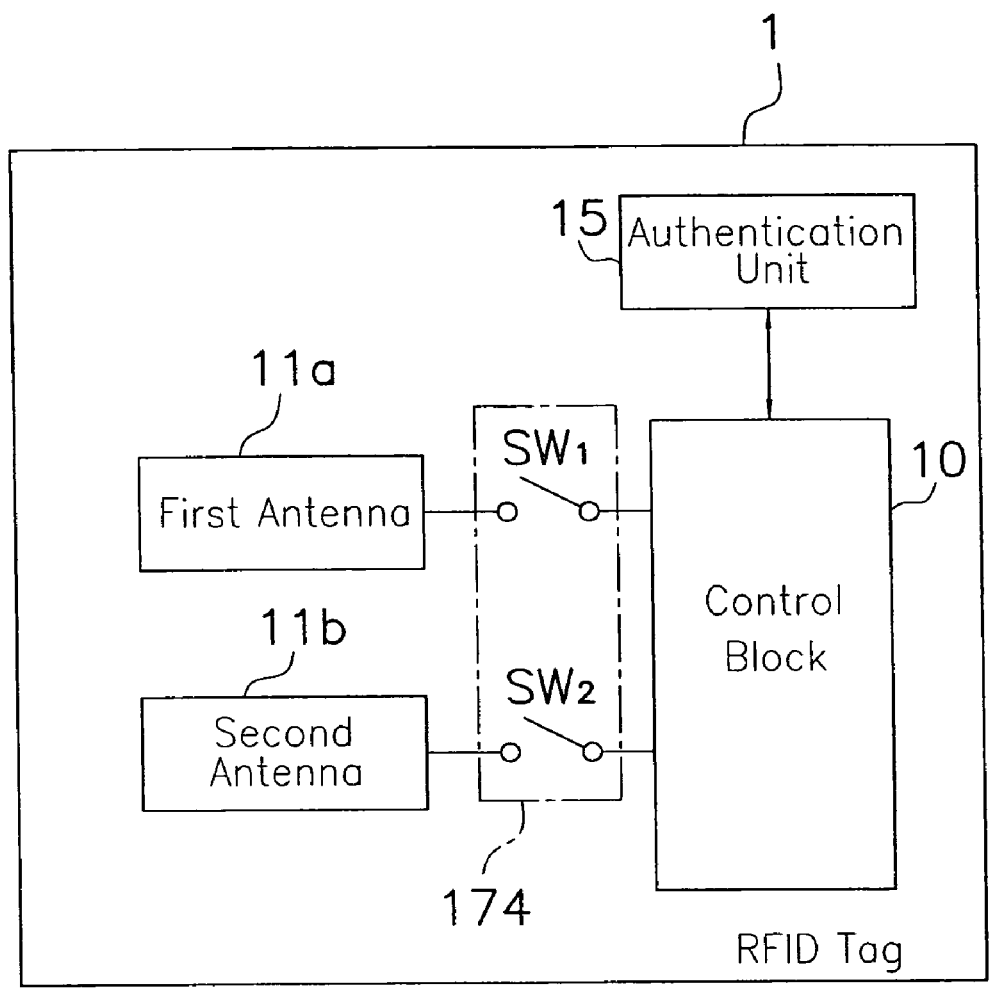
FIG. 7 is a configuration example of a connection-disconnecting unit included in an emission control unit of FIG. 6.

An emission control unit 17' may have a disconnection unit 174 for disconnecting a connection between at least one antenna and a transmission unit 13. FIG. 7 is a configuration example of the disconnection unit 174. In this example, the disconnection unit 174 includes switches SW1 and SW2. The switches SW1 and SW2 connect or disconnect the first antenna 11a and the transmission unit 13, or the second antenna 11b and the transmission unit 13. By selecting the switch SW1 or the switch SW2, the disconnection unit 174 can stop providing data to at least one antenna. Of course, there may be cases where provision of data to all the antennas is stopped. The RFID tag thus configured controls the output power of the antennas by selectively using the plurality of antennas 11a and 11b and prevents data from being illegally read out from a remote place. Similar to the RFID tag in FIG. 1, it is possible to provide the emission control unit 17' with the attenuation unit 172 including a plurality of resistors and switches, and the attenuation control unit 173 so that some or all of the output power of the plurality of antennas is attenuated. Note that a configuration in which the emission control unit 17' controls the output power of the antennas in accordance with the external operation or the instruction from the control unit 16 is the same as that of the first embodiment.

(2) Application 1

Figure 8:
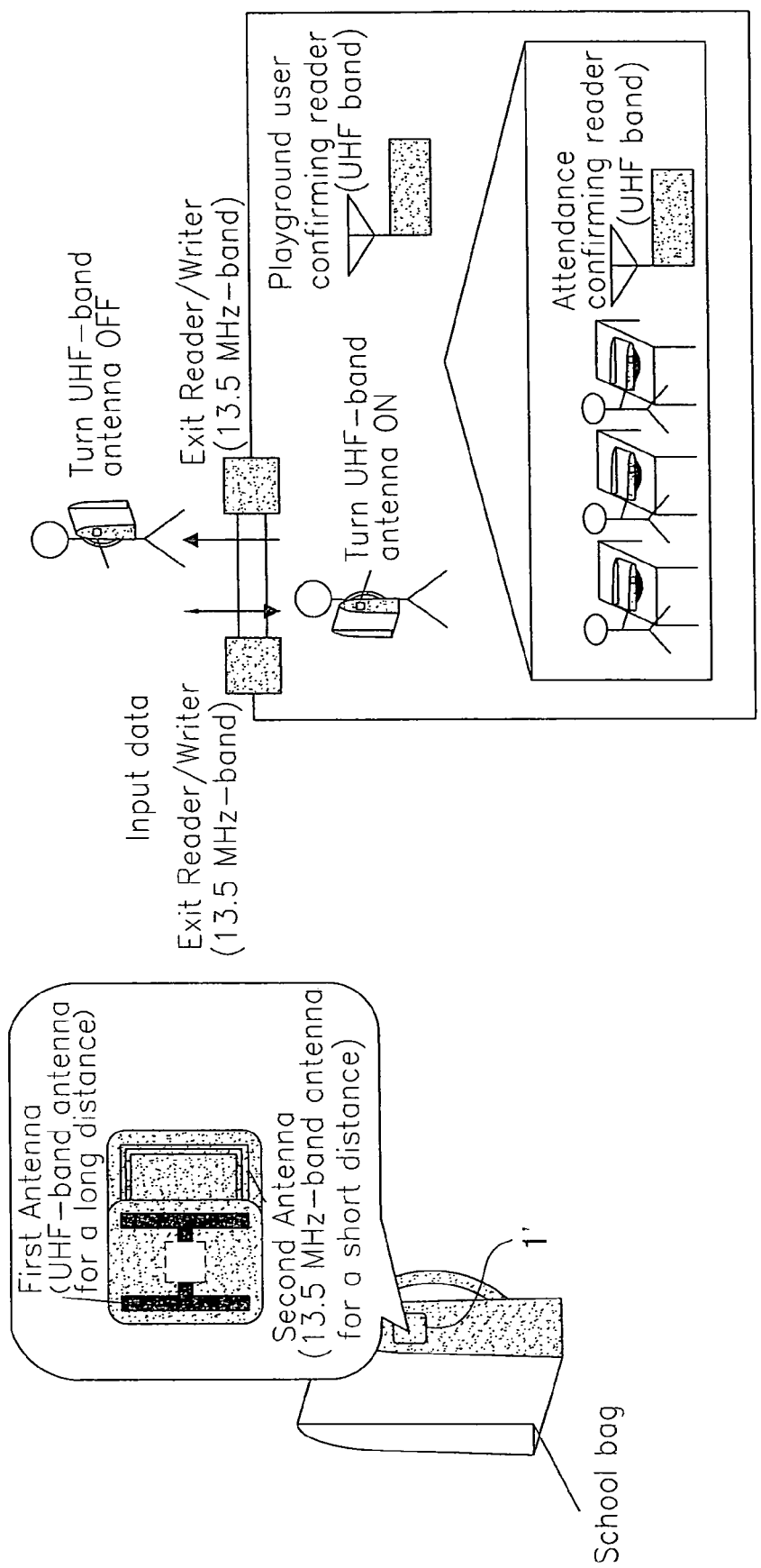
FIG. 8 is an explanatory diagram showing one example of a control of transmitted emission using an RFID tag having a plurality of antennas.

FIG. 8 is an explanatory diagram showing one example of the output power control using an RFID tag having a plurality of antennas. In this example, settings of the emission level are received externally, and the emission control unit determines the emission level based on the settings. The RFID tag is attached to a student's bag and a reader/writer is set up at a school entrance. Between the two antennas of the RFID tag, one is a UHF-band antenna for a long distance and the other is a 13.5 MHz-band antenna for a short distance. When the student arrives at the school, the RFID tag receives the settings from the reader/writer using the antenna for a short distance and switches the antenna for a long distance on. When the student leaves the school, the RFID tag switches the antenna for a long distance off according to the settings from the reader/writer. With this configuration, the student's RFID tag is prevented from being illegally read out or written in from a remote place when the student is outside the school. On the other hand, when the student is on the school premises, the student's presence can be detected using the antenna for a long distance. Preferably, the RFID tag may authenticate the reader before switching the antenna for a long distance on or off, and switch between the settings in accordance with an authentication result.

(3) Application 2

Figure 10:
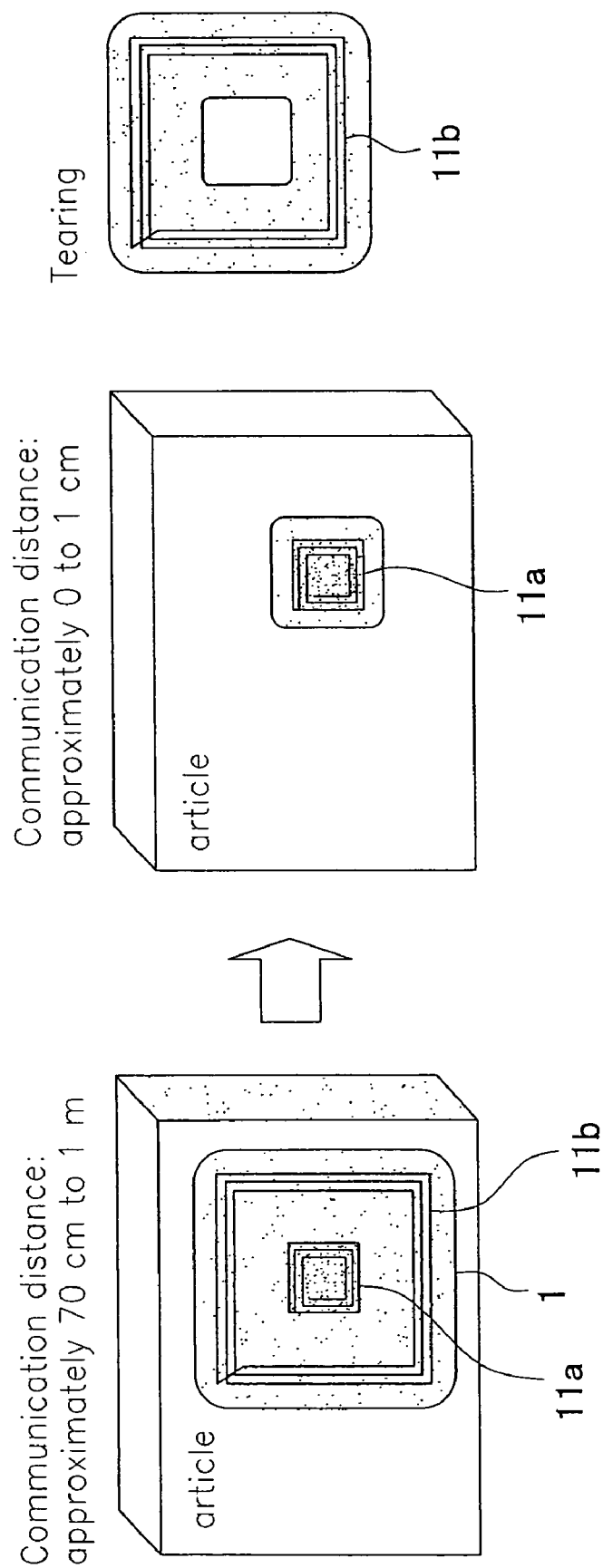
FIG. 10 is an explanatory diagram showing one example of an emission control of an RFID tag.

FIG. 9 is an explanatory diagram showing another example of a control of the output power using the RFID tag having a plurality of antennas. FIG. 9(a) shows a configuration of the RFID tag 1. The RFID tag 1 comprises, on a film body, an IC chip 30 including elements other than the antenna, a first antenna 11a electrically connected to the IC chip 30 and a second antenna 11b magnetically coupled to the first antenna 11a. Formed between the first antenna 11a and the second antenna 11bA is a perforated line 175. FIGS. 9(b) and 9(c) show that the second antenna 11b can be removed from the IC chip 30 by tearing the film along the perforated line 175. In other words, by tearing the film along the perforated line 175, a connection between the second antenna 11b and the transmission unit 13 can be disconnected. A specific example of the first antenna 11b may be an on-chip coil. A specific example of the second antenna 11b may be a coil antenna. Because such a film type RFID tag 1 is usually adhered to an article, it would be easier to remove the second antenna from the article by applying different adhesiveness on the back side of the portion to be torn off from the rest of the tag. FIG. 10 is an explanatory diagram showing that the output power of the RFID tag 1 as a whole is controlled by tearing, along the perforated line, only the second antenna 11b off the film type RFID tag 1 adhered on the article.

Note that a position of the perforated line 175 as the emission control unit 17' for controlling the output power of the antenna is not limited to the position shown in FIG. 9(a). FIG. 9(d) shows another example of position of the perforated line 175 for controlling the output power of the RFID tag 1. The perforated line 175 may be formed at such a position that at least one side of the antenna 11b is broken by tearing the film along the line.

Figure 11:
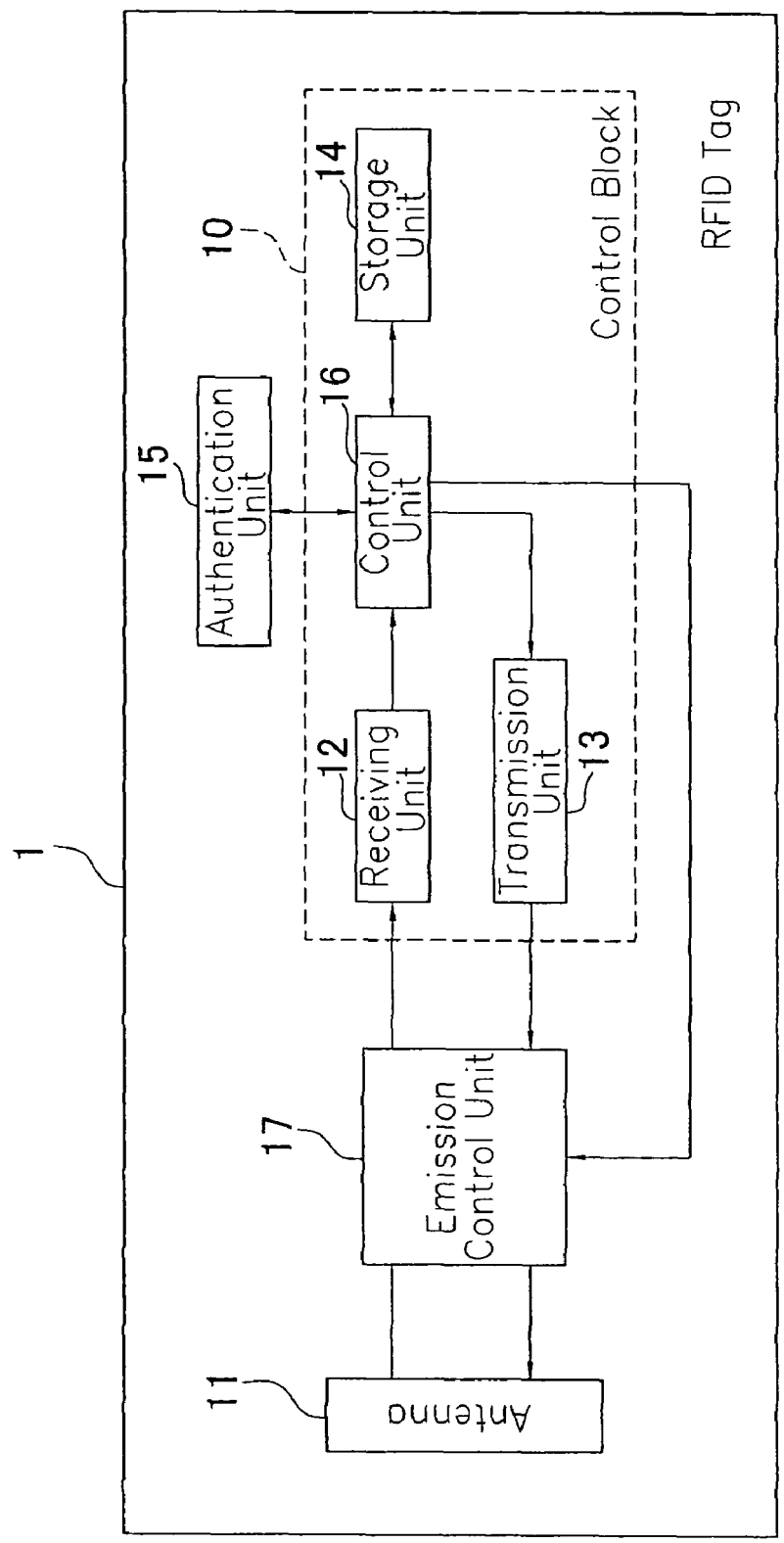
FIG. 11 shows a configuration example of an RFID tag that controls reception distance.

Other Embodiment (A) FIG. 11 shows a configuration example of the RFID tag 1 of FIG. 1 in which the antenna 11 and the receiving unit 12 are connected via the emission control unit 17. With this configuration, a distance of the radio waves that the antenna 11 receives can be adjusted. A configuration example of the emission control unit 17 may be the emission control unit 171 shown in FIG. 2.

Figure 12:
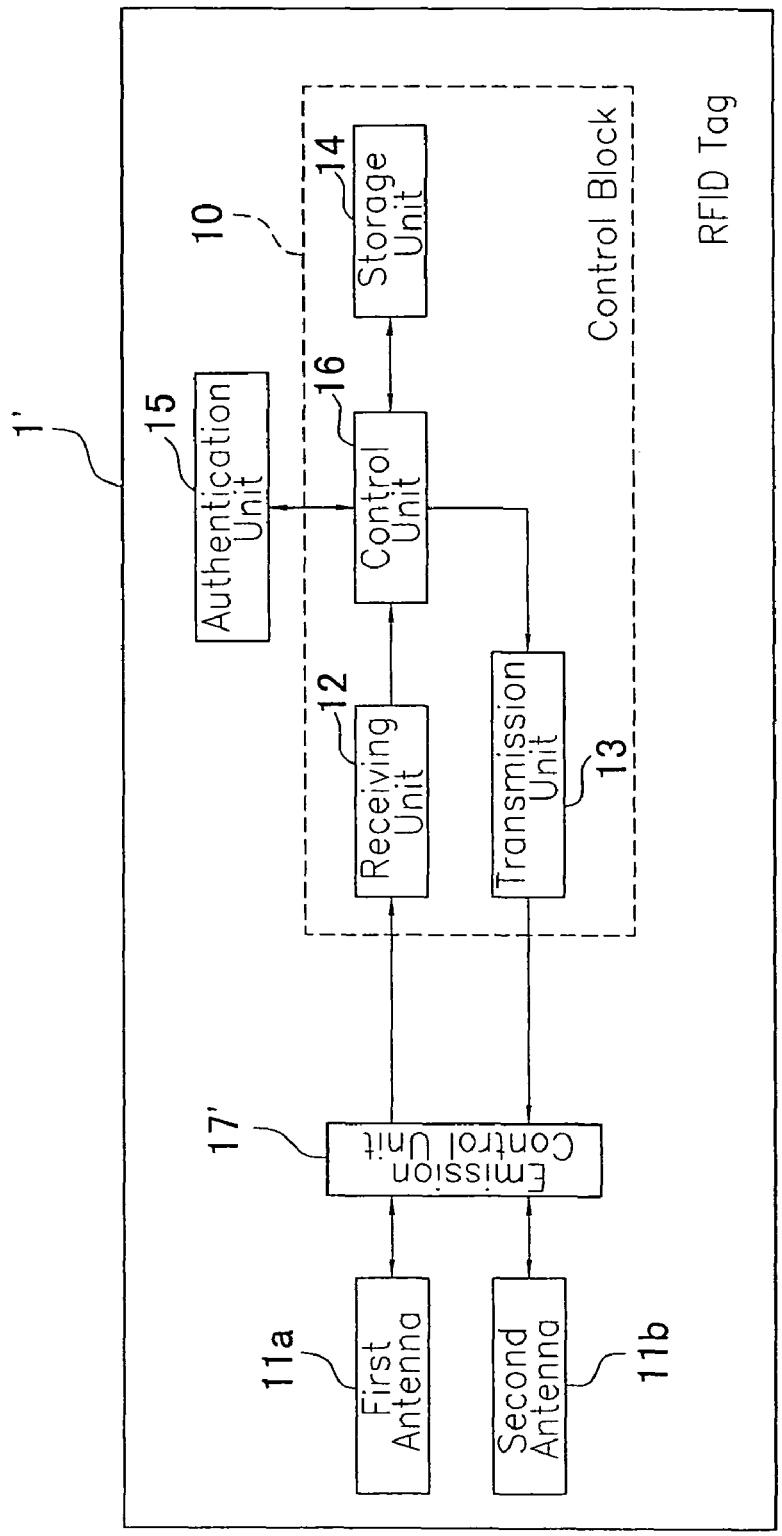
FIG. 12 shows another configuration example of the RFID tag that controls reception distance.

Similarly, FIG. 12 shows a configuration example of the RFID tag 1' of FIG. 6 in which the antennas 11a and 11b, and the receiving unit 12 are connected via the emission control unit 17'. With this configuration, a distance of the radio waves that the antennas 11a and 11b receive can be adjusted. A configuration example of the emission control unit 171 may be the configuration shown in FIG. 7.

The reception distance can be adjusted by selecting or switching between antennas in the aforementioned manner thus preventing an unauthorized write-in into the RFID tags 1 or 1' from a remote place.

(B) The aforementioned methods and a program for causing a computer to execute the methods fall within the scope of the present invention.

The present invention can be applied to both active tags and passive tags.

What is claimed is:
1. An RFID tag that stores data, comprising:
a first antenna for transmitting radio waves;
a transmission means for generating a transmission signal by modulating the data, and providing the transmission signal to the first antenna;
an emission control means for controlling an output power of the first antenna in order to transmit the transmission signal, the emission control means being connected to the first antenna and the transmission means;
a determination means for determining a value of the output power of the first antenna; and
an authentication means for authenticating an external device to which the radio waves from the first antenna are transmitted, wherein
the determination means determines the value of the output power to be set high when the external device is authenticated by the authentication means, and determines the value of the output power to be set low when the external device is not authenticated by the authentication means, and the emission control means controls the output power of the first antenna based on the value determined by the determination means; and wherein the RFID tag further comprises a setting-receiving means for receiving settings of the values of the output power from the external device, and the determination means determines the value of the output power based on a setting command for the received settings of the values when the external device is authenticated by the authentication means; and a second antenna for transmitting radio waves at an output power different from the output power of the first antenna, the second antenna being connected to the transmission means via the emission control means, wherein the emission control means has a connection control means for disconnecting a connection between the first antenna and the transmission means.

2. The RFID tag according to claim 1, wherein the emission control means includes:

an attenuation means for attenuating the output power of the first antenna; and an attenuation control means for controlling attenuation of the output power by the attenuation means.

3. The RFID tag according to claim 2, wherein the attenuation means includes a plurality of resistors, and the attenuation control means connects the transmission means and the first antenna via at least one of the plurality of resistors.

4. The RFID tag according to claim 2, wherein the attenuation means includes a variable resistor connected between the transmission means and the first antenna, and the attenuation control means adjusts a resistance value of the variable resistor.

5. The RFID tag according to claim 1, wherein the connection control means includes a switching means for switching the connection between the transmission means and the first antenna ON and OFF.

6. The RFID tag according to claim 5, further comprising a second antenna for transmitting radio waves at an output power different from the output power of the first antenna, the second antenna being connected to the transmission means via the emission control means.

7. The RFID tag according to claim 1, wherein the determination means determines the value of the output power to be set high when the external device is authenticated by the authentication means and confidentiality of the data to be transmitted is set high.

8. The RFID tag according to claim 1, wherein the first antenna and the second antenna are electrically connected to the transmission means respectively.

9. The RFID tag according to claim 1 further, wherein the first antenna is electrically connected to the transmission means, and the second antenna is magnetically connected to the first antenna.

10. The RFID tag according to claim 9, wherein the first antenna and the second antenna are formed on a film having a tear-off line between the first and second antennas.

11. The RFID tag according to claim 1, wherein the first antenna and the second antenna are formed on a film having a tear-off line between the first and second antennas.

* * * * *